Oct. 10, 1950     K. TOMLINSON     2,524,942
FEATHER PLUCKING FINGER
Original Filed Dec. 29, 1944
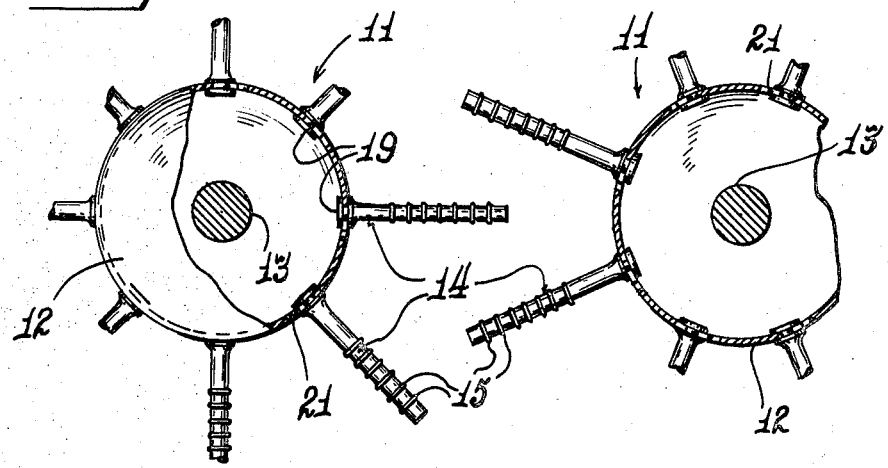
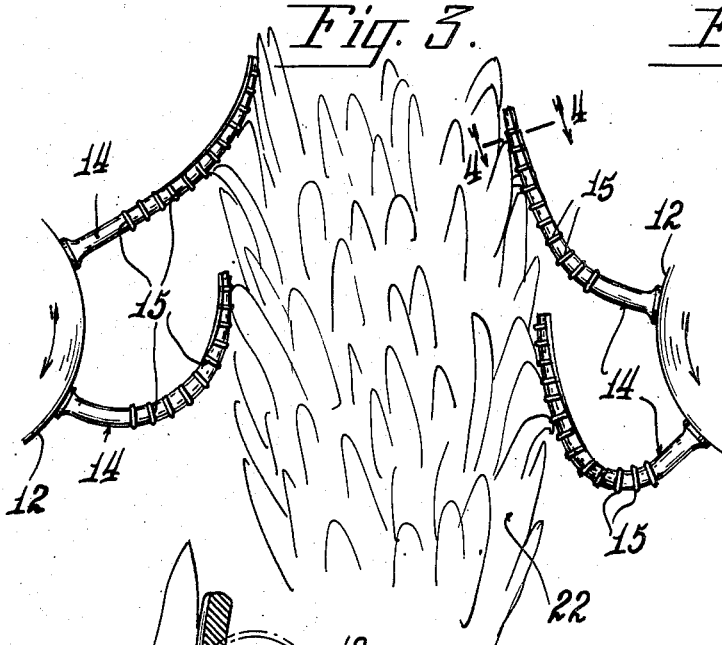
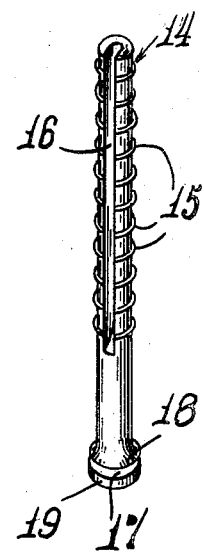
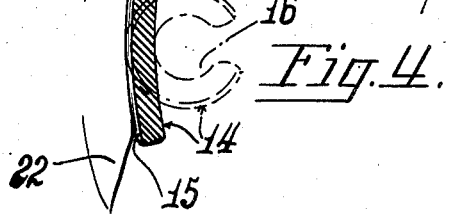
INVENTOR.
KENT TOMLINSON
BY
ATTORNEY

Patented Oct. 10, 1950

2,524,942

UNITED STATES PATENT OFFICE 2,524,942

FEATHER PLUCKING FINGER

Kent Tomlinson, Chicago, Ill., assignor, by mesne assignments, to Edward J. Albright, Chicago, Ill.

Original application December 29, 1944, Serial No. 570,386. Divided and this application April 20, 1950, Serial No. 158,761

2 Claims. (Cl. 17—11.1)

This application is a divisional application carved out of application Serial No. 570,382 filed December 29, 1944 which matured into Patent No. 2,512,843 dated June 27, 1950.

The invention relates to plucking machines and more particularly to a novel feather plucking finger in an apparatus for plucking feathers from fowls.

Machines of the type commonly employed to remove feathers from fowls operate upon the principle of striking the fowl and rubbing the feathers therefrom, and frequently the means employed for accomplishing these operations are impractically designed or are otherwise constructed so as not to operate with the utmost efficiency that might be expected of such means. It is therefore, an object of the present invention to provide an apparatus for removing feathers from a fowl with novelly constructed elements of a kind which will strike and rub the fowl with the requisite degree of firmness without endangering the fowl to damage resulting from bruises, abrasion, or the like.

Heretofore, in machines for plucking feathers from fowl, plucking fingers were employed which presented a very small feather removing surface with consequent inefficiency in operation. It is, therefore, a further object of the present invention to provide a highly efficient plucking finger which presents a large operating surface and which will efficiently remove the feathers.

Another object of the present invention is to provide a novel and highly efficient means for plucking feathers from fowl which is simple and inexpensive to manufacture and which is readily replaceable.

Another object of the present invention is to provide a feather plucking apparatus with flexible plucking fingers mounted upon a rotatable drum or the like in such manner as to be easily and quickly attached to or separated from said rotatable drum.

Another object is to provide flexible plucking fingers in an apparatus of the kind described with novel structural features adapting said fingers to more readily serve the purpose for which they are provided.

Other and further objects of the present invention will be apparent from the following description and claims and are illustrated in the accompanying drawings which, by way of illustration, show a preferred embodiment and the principle thereof and which is considered to be the best mode contemplated for applying that principle. Other embodiments of the invention embodying the same principle may be used and structural changes may be made as desired by those skilled in the art without departing from the present invention and the purview of the appended claims.

In the drawings:

Fig. 1 is a side elevational view of a pair of rotors having plucking fingers mounted thereon, one of said elements being shown partly in section.

Fig. 2 is a perspective view of one of the plucking fingers.

Fig. 3 is a fragmentary detail view illustrating the operation of the plucking fingers.

Fig. 4 is an enlarged sectional detail view of a plucking finger, taken on line 4—4 of Fig. 3.

The feather plucking apparatus illustrated in the accompanying drawings is intended to have the fowl carried by suitable conveyor means (not shown here, but of the type described in my Patent No. 2,512,843 dated June 27, 1950) between a pair of rotors 11, as best illustrated in Figs. 1 and 3. Each of the rotors preferably consists of a drum 12 which is suitably journaled about a shaft 13 providing for the rotor 11 and allowing for rotation thereof.

Each of the rotors 11 is provided with novel means to effectively engage the fowl as it passes through the apparatus so as to remove the feathers therefrom. To this end each drum 12 carries a plurality of circumferentially spaced resilient fingers 14. The fingers 14 are of such length as to extend into the space between the drums 12 with the fingers of one drum slightly overlapping the fingers on the other drum when the two rotors are in operation. When the rotors are at rest, the fingers 14 will hang substantially limp from the drums, however, when the drums are rotated, said fingers are extended outwardly substantially radially from said drums due to the centrifugal forces of rotation. For this purpose, (and for another purpose to be described below) said fingers preferably are formed of rubber or material of like composition which is not readily damaged by abrasion or heat.

As best shown in Fig. 2, each finger 14 preferably is substantially round in cross-section and is provided on its outside surface throughout a greater portion of its length with spaced projections 15, preferably in the form of circumferential ribs, and one side thereof is suitably channelled or otherwise cut away, as at 16, through a greater portion of its diameter to provide, in effect, a finger substantially U-shaped in section. The channel 16 and the resiliency of the finger 14 allow the fingers to flatten upon striking the fowl as will be described below.

The base of the finger 14 to be mounted on the drum 12 is suitably enlarged and recessed circumferentially, as at 17 to provide spaced mounting flanges 18 and 19. These features allow for the rapid and removable mounting of the fingers 14 in openings 21 in the drum 12. Such openings are preferably in the form of bayonet slots to provide for a rapid yet secure mounting.

Upon reference to Fig. 3, it will be noted that the fingers 14 are arranged on the drums 12 so as to locate the side thereof having the channel 16 in such position that the unchannelled or ribbed surface of the fingers will strike the fowl 22 as the fowl passes between the rotors 11. This positioning of the fingers is of utmost importance since it is highly desirable to present as large an area of the ribbed face of each finger against the fowl so as to increase the effectiveness of said fingers in the feather removing operation.

As has been noted hereinabove, the drums 12 and fingers 14 constitute rotors operable in unison (in the direction of the arrows in Fig. 3) in such a manner as to cause the fingers 14 to strike against and be flexed considerably by contact with the fowl 22. This flexing of the fingers 14 is effective to cause them to flare outwardly laterally due to the provision of the groove 16 on the rear face thereof and the resiliency of the finger material. Such flaring out of the fingers 14 is best illustrated in Fig. 4 where it will be noted that a substantially flat surface, having projections or ribs 15 thereon, is presented for rubbing engagement with the fowl. Thus it will be apparent that a maximum area of the fowl is more quickly defeathered by operation of the device herein disclosed. The flexibility of the fingers 14 further prevents any damage to the fowl while efficiently removing the feathers therefrom.

It should be apparent at this time that there has been provided a very efficient and highly practical finger for plucking feathers from fowl and that the feathers from such fowl are removed at a far greater speed and consequently far less cost than has heretofore been thought possible. Such is the case because of the specific construction of the fingers which enables said fingers to flex sufficiently to insure contact thereby over a greater area than has heretofore been possible with known types of defeathering devices. It should also be apparent that the specific construction of the fingers will efficiently remove the feathers without damage to the fowl.

Although a detailed description of the invention has been disclosed herein, it should be understood that the device is capable of modification in structural detail without departing from the spirit of the invention which is limited only by the scope of the appended claims.

I claim:

1. A flexible finger for plucking feathers from fowl consisting of an elongated resilient body, said body having a longitudinal groove therein of sufficient length and depth to render a substantial portion of said body U-shaped in cross-section, and a plurality of ribs on the U-shaped portion of said body, each rib being disposed in a plane substantially perpendicular to said body and each rib extending circumferentially around said body and terminating at the walls of said longitudinal groove.

2. A flexible finger for plucking feathers from fowl consisting of an elongated resilient body substantially circular in section, said body having a longitudinal groove therein, and a plurality of ribs on the ungrooved surface of said body, said ribs being disposed in planes substantially perpendicular to said body and said ribs extending circumferentially around said ungrooved surface.

KENT TOMLINSON.

REFERENCES CITED

The following references are of record in the file of this patent:

UNITED STATES PATENTS

| Number | Name | Date |
|---|---|---|
| 2,413,712 | Jerome | Jan. 7, 1947 |

FOREIGN PATENTS

| Number | Country | Date |
|---|---|---|
| 116,500 | Australia | Jan. 27, 1943 |